(12) United States Patent
Abdollahian et al.

(10) Patent No.: US 10,048,803 B2
(45) Date of Patent: Aug. 14, 2018

(54) DETECTING BACKSIDE FORCE IN A TOUCH-SCREEN DEVICE

(71) Applicant: Apple Inc., Cupertino, CA (US)

(72) Inventors: Golnaz Abdollahian, San Francisco, CA (US); Wayne C. Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/462,064

(22) Filed: Mar. 17, 2017

(65) Prior Publication Data

US 2017/0269785 A1     Sep. 21, 2017

Related U.S. Application Data

(60) Provisional application No. 62/309,735, filed on Mar. 17, 2016.

(51) Int. Cl.
  *G06F 3/041*   (2006.01)
  *G06F 3/044*   (2006.01)
  *G06F 3/0485*  (2013.01)
  *G06F 3/0488*  (2013.01)

(52) U.S. Cl.
  CPC .......... *G06F 3/0418* (2013.01); *G06F 3/044* (2013.01); *G06F 3/0414* (2013.01); *G06F 3/0416* (2013.01); *G06F 3/0485* (2013.01); *G06F 3/04883* (2013.01); *G06F 3/04886* (2013.01); *G06F 2203/04803* (2013.01)

(58) Field of Classification Search
  CPC .... G06F 3/0418; G06F 3/0414; G06F 3/0416; G06F 3/044; G06F 3/0485; G06F 3/04883; G06F 3/04886; G06F 2203/04803
  See application file for complete search history.

(56) References Cited

U.S. PATENT DOCUMENTS

| | | | | |
|---|---|---|---|---|
| 6,333,736 B1* | 12/2001 | Sandbach | ............. | G06F 3/0414 178/18.03 |
| 2002/0163509 A1* | 11/2002 | Roberts | ................. | G06F 3/0414 345/173 |
| 2003/0234769 A1* | 12/2003 | Cross | .................... | G06F 3/0412 345/173 |
| 2010/0164904 A1* | 7/2010 | Kim | ........................ | G06F 3/038 345/174 |
| 2013/0141373 A1* | 6/2013 | Takuma | ................ | G06F 3/0488 345/173 |
| 2013/0257769 A1* | 10/2013 | Sheik-Nainar | ........ | G06F 3/0488 345/173 |
| 2017/0097733 A1* | 4/2017 | Edgar | ................... | G06F 3/0418 |

* cited by examiner

*Primary Examiner* — Stephen G Sherman
(74) *Attorney, Agent, or Firm* — DLA Piper LLP US; Kristoffer W. Lange (57) ABSTRACT

In one aspect, the present disclosure relates to a method including detecting force applied to a force sensing layer in a device and detecting touch contacts applied to a touch screen layer in a device. The method also includes determining if the location and/or amount of force detected by the force sensing layer correlates to a touch contact, and, if it correlates, treating the force as front-side force, while if the location and/or amount of force detected by the force sensing layer does not correlate to a touch contact, treating the force as a back-side force. Based on the type of force detected, appropriate action may be taken, including back-side specific actions such as multi-tasking application switches or content or viewport manipulation.

21 Claims, 7 Drawing Sheets

DETECTING BACKSIDE FORCE IN A TOUCH-SCREEN DEVICE

CROSS-REFERENCE TO RELATED APPLICATION

This application claims priority to and the benefit of U.S. Provisional Patent Application No. 62/309,735, filed on Mar. 17, 2016, the disclosure of which is incorporated herein by reference in its entirety.

FIELD OF THE INVENTION

The present disclosure relates generally to detecting force on the back side (i.e., the side opposite the touch-screen) in a touch-screen device.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. Touch sensor panels may generally be configured to detect touches from a user's fingers, which generally have a surface area that contacts the touch sensor panel to disturb the stimulation signal sufficiently for touch location to be recognized.

Touch sensor panels may also incorporate or be co-located with force sensors. For example, an array of force sensors may be placed underneath the touch panel, or the touch panel may be constructed such that the capacitance across the panel varies in response to applied force and the capacitance is detected. Other arrangements of force sensors that translate an applied force into an electrical signal may also be used in a touch sensor panel in order to provide a force sensitive touch sensor panel. Force sensitive touch sensors may generally be configured to detect force applied by a user's fingers, which can apply sufficient force to cause the touch panel to deform. In a mobile device that has a display that is both touch sensitive and force sensitive, force applied to the display may enable additional forms of interaction with the device such as previewing content.

When a user is holding a mobile device and interacting with the device, they may hold the device in such a fashion that their hand or fingers rests on the rear of the device. When they interact with the device, the portion of the hand contacting the rear of the device may apply force to the rear of the device, either unintentionally or intentionally. This force applied to the rear of the device may cause the rear housing to deform, thereby transferring a deformation to the force sensors. Force sensors that detect force by measuring capacitance variation due to deformation or by directly sensing force may not be able to distinguish whether the force is due to force on the front of the device or the rear of the device. The force sensor may then detect the force as if the user had intended to apply it to the front of the device. This results in incorrect detection of force.

SUMMARY OF THE INVENTION

Embodiments of the present disclosure include a method for detecting back-side force in a mobile device. In the method according to some embodiments, force applied to a force sensor in the device is measured. One or more touch contacts are detected via a touch sensor. The measured force is then correlated to at least one of the one or more touch contacts. When the measured force does not correlate to at least one of the one or more touch contacts, a back-side force specific action is taken.

Other features and advantages will become apparent from the following detailed description and drawings.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

The present disclosure describes a touch-screen device that may be configured to detect when a user applies force to the back side of the device. The touch-screen device may use the backside force detection for user interaction, or may use it to prevent backside force from being interpreted as a front side force or interaction.

Figure 1:
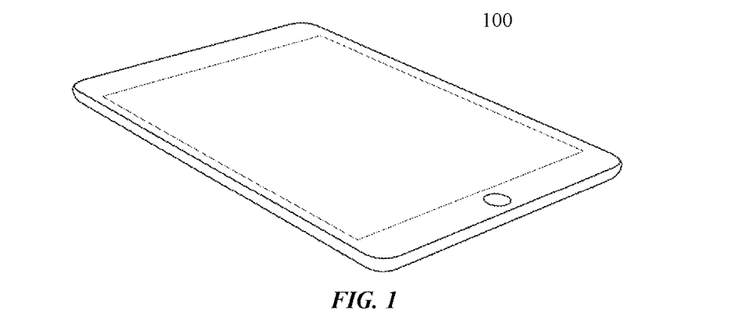
FIG. 1 shows a touch screen device in accordance with an embodiment of the present disclosure.

FIG. 1 shows an example of a touch screen device 100, such as a smartphone or table, as described in more detail herein. The touch screen device 100 may include one or more touch sensors and one or more force sensors.

Figure 2:
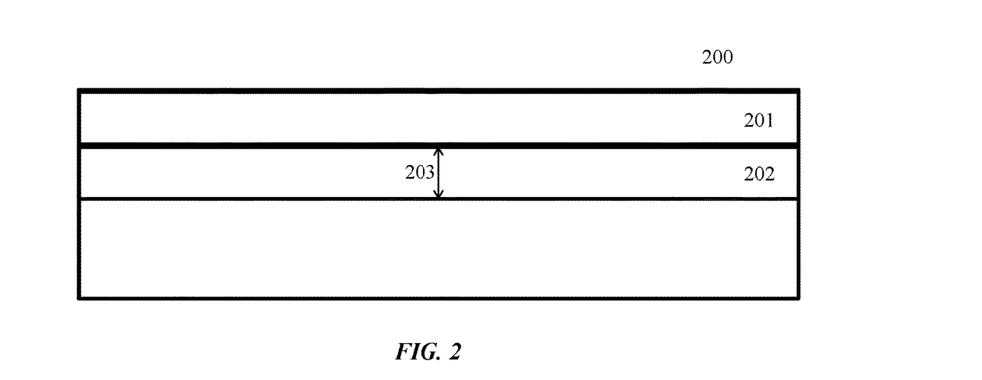
FIG. 2 shows a cross-section of a touch screen device incorporating touch sensing and force sensing layers (i.e., a force-sensing touch screen device.)

FIG. 2 shows an example of a cross-section of a touch screen device 200, incorporating a touch sensing display layer 201 and a force sensing layer 202. In some embodiments, force sensing layer 202 operates as a capacitance sensor measuring capacitance across a compressible force sensing layer 202. As capacitance between two parallel surfaces is directly related to distance between the surfaces, the capacitance thus describes the distance 203 across the force sensing layer.

Figure 3:
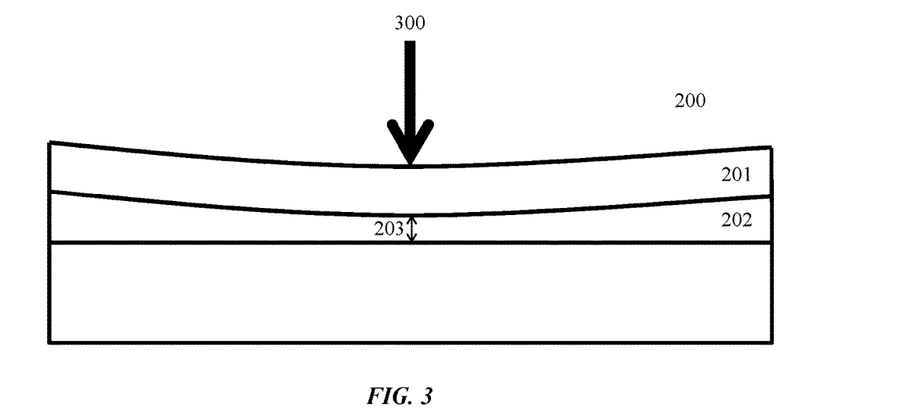
FIG. 3 shows a cross-section of a force-sensing touch screen device when force is being applied to the screen (i.e., the front or top of the device.)

FIG. 3 shows an example of a cross-section of touch screen device 200 when a force 300 is applied to the touch sensing display layer 201 (i.e., the top or front of the device 200). As force 300 is applied to the top of the device, the touch sensing display layer 201 is deformed underneath the point at which the force is applied. This deformation applies a force to force sensing layer 202. In embodiments in which force sensing layer 202 operates by sensing capacitance across the compressible force sensing layer 202, the deformation compresses the layer, thereby reducing the distance 203 between the top and bottom of the layer. In these embodiments, this reduction in distance 203 results in increased capacitance, which the force sensing layer 202 measures. The measured amount of capacitance can then be mapped to an amount of deformation and thereby to an amount of force applied. By incorporating localized measurements of capacitance, a location of the applied force can be determined as well as an amount of the applied force. In other embodiments, force sensing of the force applied by the deformation may be accomplished by incorporating localized measurements of strain or other force sensor technologies.

Figure 4:
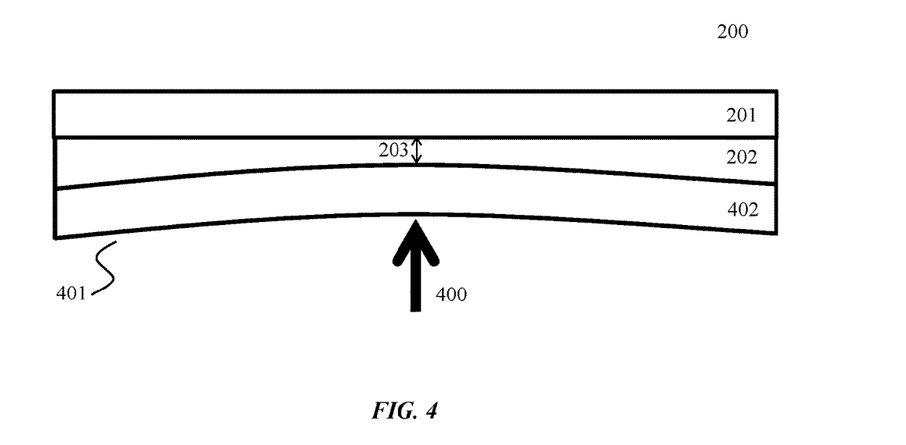
FIG. 4 shows a cross-section of a force-sensing touch screen device when force is being applied to the rear housing of the device (i.e., the back or bottom of the device.)

FIG. 4 shows an example of a cross-section of touch screen device 200 when a force 400 is applied to the rear housing 401 of the device (i.e., the bottom or back of the device 200). As force 400 is applied to the bottom of the device, the rear housing 401 may deform upwards. This deformation may in turn apply force to the internals 402 of the device, causing movement or deformation of internals 402 and resulting in a force being applied to the force sensing layer 202. In embodiments using a compressible force sensing layer 202 which operates by sensing capacitance across the force sensing layer, this results in compression of the force sensing layer 202 and thus, by the same process as described above, reduction in distance 203 and thus measurement of reduced capacitance. By measuring the capacitance as above, the location and amount of force applied may be determined.

As shown above, force sensing layer 202 may not be capable of distinguishing between a force applied to the layer from the top, a force applied to the layer from the bottom, and a force applied to the layer from top and bottom simultaneously (e.g., if a user grips a device tightly from both front and back.) In each case, the same reduction in distance 203 may be observed and the same force and location may be measured.

In order to prevent force applied to the back of the device from being detected as a force applied to the front of the device, the manufacturer can stiffen the housing of the device. By stiffening the housing, back side force induces less deformation of the back side of the housing and thus less force applied to the force sensing layer. This can be done, for example, by using a stiffer material for the housing, or by increasing the thickness of the housing. These approaches can potentially have negative impacts on the weight, cost, and/or industrial design of the device. In addition, stiffening the housing does not allow the device to detect back side force separately from front side force.

Figure 5:
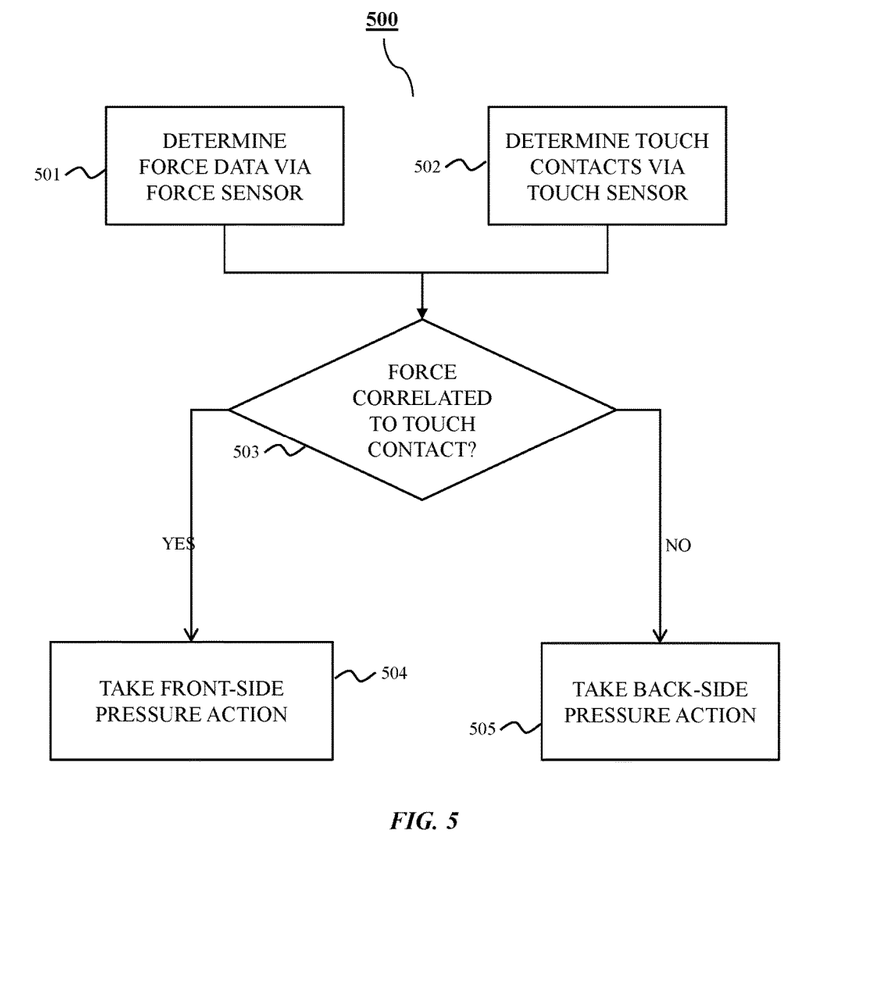
FIG. 5 shows a method of distinguishing between back-side force and front-side force according to the present disclosure.

FIG. 5 illustrates a method 500 according to some embodiments of the present disclosure. In these embodiments, the housing may be left without additional stiffening, or even have its stiffness reduced. In step 501, an applied force is detected. In step 502, the touch sensor detects touch input on the front of the device. In step 503, the applied force is correlated to the touch input. If the touch input correlates to the applied force, then the applied force is determined to be front side force and the user interface takes the appropriate action for front side force in step 504. In contrast, if the touch input does not correlate to the applied force, then the applied force is determined to be back side force and the user interface takes the appropriate action for back side force in step 505. These steps will now be described in further detail.

In the embodiments of the present disclosure described in FIG. 5, a force sensing layer is incorporated. This force sensing layer may be a layer used for detecting front-side force, as in existing force-sensitive touch displays. As described above, this sensor may operate by sensing capacitance, strain, or other metrics. In step 501, this force sensing layer experiences a force. This force may be applied from the front of the device, the back of the device, or both. This force is then measured and a measurement of force generated. For example, the variation in capacitance across the force sensing layer may be measured. This measurement may then be further processed. In some embodiments, the variation in capacitance is treated as a map (i.e., a three-dimensional measurement in which two dimensions represent the location of the measured variable on a plane in space and the third dimension represents the intensity of the measured variable) and the map is processed to produce a map of applied force. In some embodiments, processing is performed by application of a matched filter to the map of capacitance variation. In some embodiments, the matched filter is calibrated to the design of device. In other embodiments, the matched filter is individually calibrated per device. In one embodiment, the map of applied force is substantially linearly proportional to the actual applied force. In another embodiment, the map of applied force is substantially linearly proportional to the actual applied force until a threshold level of force is reached, after which the map of applied force is non-linearly proportional with respect to the actual applied force. Step 501 thus outputs a measurement of force, such as a map of applied force.

In step 502, a touch sensor (e.g., a touch sensing layer) detects touch input on the front of the device. Such a touch sensor may comprise any of a number of types of touch sensors, such as a capacitive touch sensor. The touch sensor detects the location of touch contacts on a plane, such as the display of a mobile device. In some embodiments, the touch sensor generates a map of the locations in which a touch contact is detected. In some embodiments, known as multi-touch sensors, multiple touch contacts are detected simultaneously. Step 502 thus outputs a measurement of the location of at least one touch contact, and may output a measurement of the location of multiple touch contacts.

In step 503, the measurement of force created in step 501 and the measurement of touch input are correlated with one another to determine if a touch contact and an applied force are correlated. In one embodiment, this is done by determining centroids of the touch contacts and centroids of the applied force using maps of the location of touch contacts and the location and intensity of applied force. If the centroids are within a threshold distance of one another, they are considered to be correlated. If the centroids are not within a threshold distance of one another, they are considered not to be correlated. In some applications of this embodiment, correlation also incorporates the intensity of the touch contact. For example, in some embodiments, in addition to correlating location of touch contacts and applied force, the size of the area within which a touch contact is detected may additionally be correlated to the intensity of the force applied. Other methods of correlating the touch contacts to the applied force may also be used to determine if an applied force is related to a touch contact.

In some embodiments, calibration may be employed to refine the location for an applied force. For example, if a force on various locations on the back of the device has been calibrated as measured at different locations on the touch sensor (perhaps due to intervening structures), a map may be used to refine the force sensor data prior to performing correlation in step 503.

Because the touch sensor only detects touches from the front of the device, correlation of the location and/or intensity of a touch contact and an applied force provides evidence that the force is being applied to the front of the device. In contrast, if a touch contact and applied force are not correlated, then the applied force is likely being applied from the back of the device, where the touch sensor will not register a touch contact. Step 503 can thus distinguish between correlated (i.e., front-side) force and uncorrelated (i.e., back-side) force. Based on this determination, either of step 504 or 505 may be performed.

In step 504, the applied force has been correlated to a touch contact. This force is thus interpreted as front-side force and appropriate action is taken (e.g., a "peek" or "pop" of content.)

In step 505, the applied force has not been correlated to a touch contact. This force is thus interpreted as back-side force. In the event of detection of back-side force, various actions may be taken. In some embodiments, back-side force is ignored. By ignoring back-side force, only force correlated to detected touch contacts is treated as force, which allows the system to filter out undesired force signals derived from back-side force.

In other embodiments, back-side force causes an action specific to back-side force to be taken. Back-side force specific actions may be triggered by any of a number of force locations or gestures on the back side of the device. In some embodiments, back-side force specific actions may be triggered by force presses applied to halves of the back of the device, or in corners of the back of the device. The back of the device may be divided unequally as well, such as by providing a narrow left force zone, a wide right force zone, and a very wide central force zone. In one embodiment, the left force zone may be ⅙ of the device's width, the right force zone may be ⅓ of the device's width, and the central force zone may be ½ of the device's width. In some embodiments, portions of the back side of the device have back-side force specific actions associated, while other portions of the back side of the device have no action associated with them. In some embodiments, the arrangement of zones on the device's back side may change as the device is rotated into a portrait or landscape display mode.

In some embodiments, multiple back-side forces may be detected in multiple locations so as to provide additional interactions with the device. For example, in one embodiment, simultaneous force presses on the left and right half may be treated separately from force presses on each of the left or right half individually.

Figure 6A:
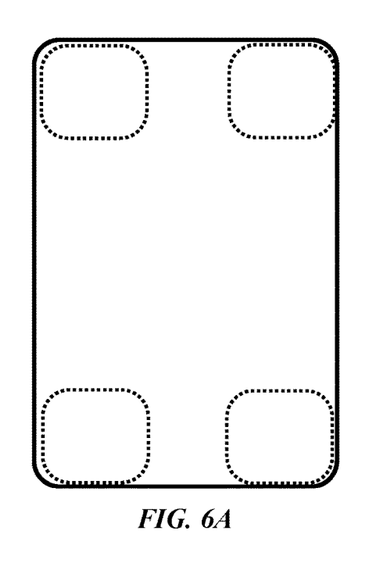
FIGS. 6A-D show possible arrangements of force interaction zones on the back side of the device, according to aspects of the present disclosure.
Figure 6B:
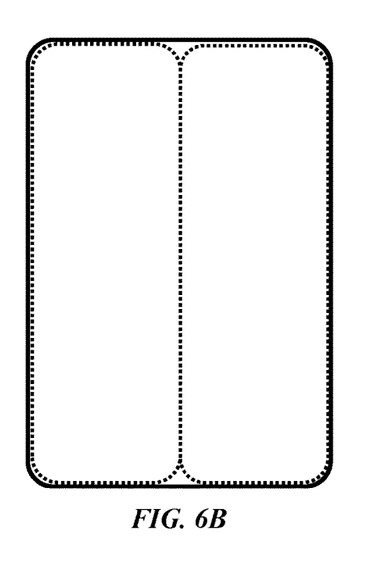
Figure 6C:
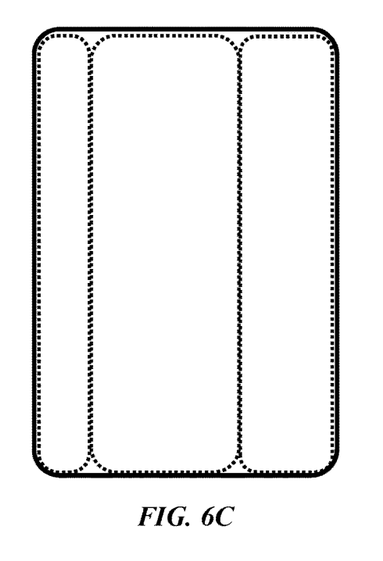
Figure 6D:
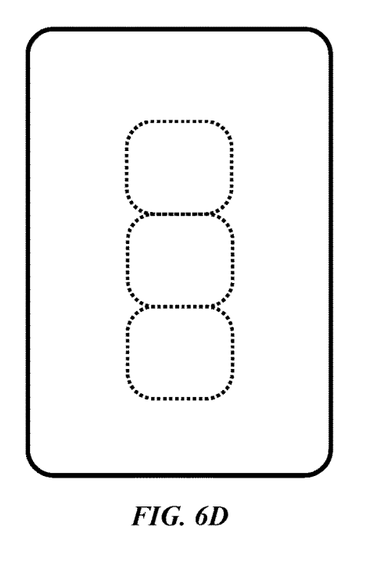

FIGS. 6A-6D illustrate several such possible divisions of the back-side of the device. FIG. 6A illustrates an embodiment in which force in the corners is detected. FIG. 6B illustrates an embodiment in which force in left and right halves is detected. FIG. 6C illustrates an embodiment in which force in unequally divided zones is detected. FIG. 6D illustrates an embodiment in which force is ignored at the edge of the back of the device but detected in several separate central zones.

Figure 7:
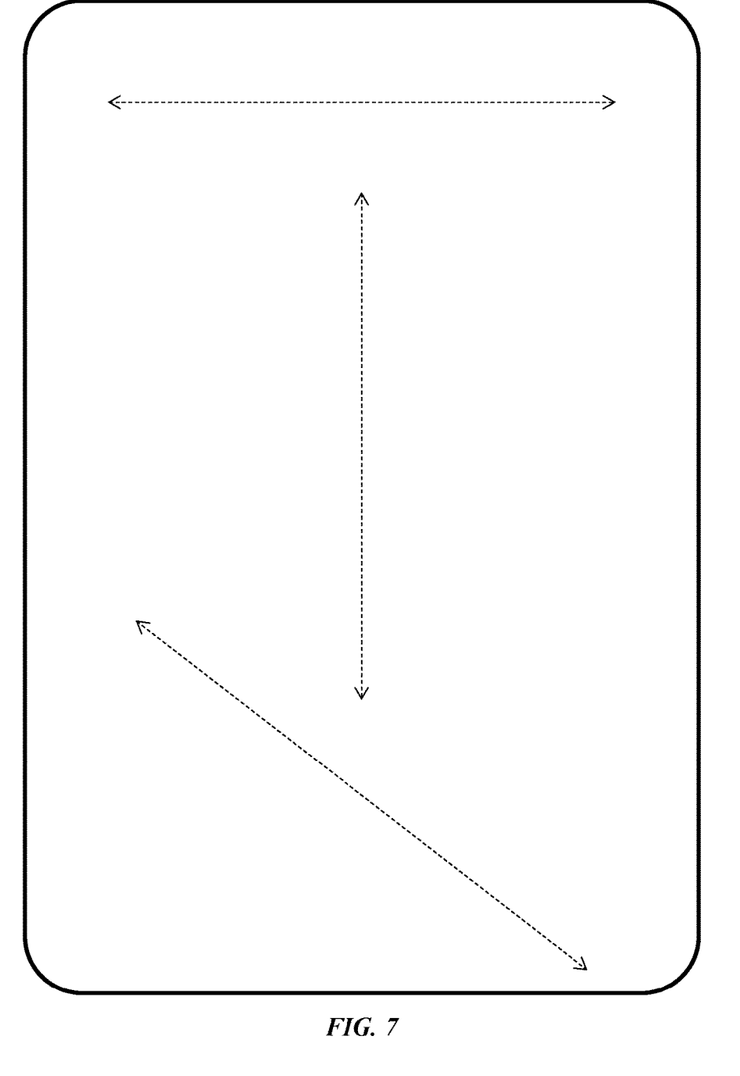
FIG. 7 shows possible force gestures on the back side of the device, according to aspects of the present disclosure.

In some embodiments, back-side force specific actions may be triggered by force swiping along the back of the device vertically, horizontally, or at a diagonal. FIG. 7 illustrates several such possible gestures.

In one embodiment, back-side force presses at the edges of the device may provide page changes in paginated documents as a back-side force specific action. For example, in one embodiment a force press on the left half of the back side may trigger going back a page, while a force press on the right half of the back side may trigger going forward a page. In another embodiment, a force press on the left quarter may trigger going back a page, a force press on the center-left quarter may trigger an action similar to scrolling upward one stop on a mousewheel (e.g., scrolling upward three lines), a force press on the center-right quarter may trigger an action similar to scrolling downward one stop on a mousewheel (e.g., scrolling downward three lines), and a force press on the right quarter may trigger going forward a page. Other mappings between back-side force detection zones and gestures and user interface interactions may also be incorporated into embodiments of the present disclosure.

In some embodiments, back-side force may be used to provide multi-tasking interactions. For example, in some embodiments a back-side force press or force swipe action might trigger switching an application to a split-screen or picture-in-picture mode. In other embodiments, a back-side force press or force swipe action might switch between applications. In one embodiment, applying a force press to the left half of the back of the device may switch to the previous application while a force press applied to the right half of the back of the device may switch to the next application.

In other examples of a back-side force specific action, back-side force may provide additional axes of interaction (e.g., additional rotation axes in content). In one embodiment, back-side force swiped vertically along the back side of the device may cause content to tilt along an axis running horizontally from the center-left side of the display to the center-right side of the display. In one embodiment, back-side force swiped horizontally along the back side of the device may cause content to tilt along an axis running from the top-center of the display to the bottom-center of the display.

Back-side force specific actions may also be used to provide additional ways of controlling the device without interacting with content. For example, in one embodiment, while front-side force or touches interact with the displayed content, back-side force swipes may be used to provide translation of the display's view of the content without interacting with the content. In some embodiments, horizontal swipes across the back side of the device may cause a horizontal translation across the displayed content. In some embodiments, vertical swipes may cause a vertical translation across the displayed content.

Figure 8A:
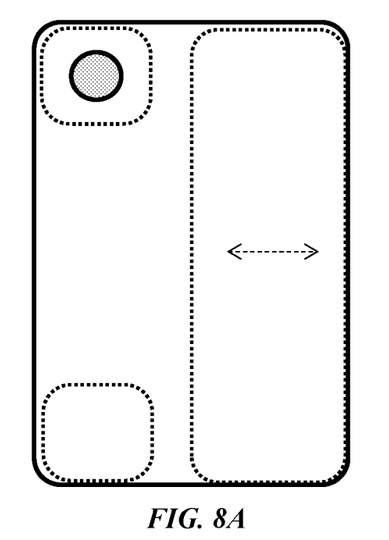
FIGS. 8A-8B show a possible combined gesture on the back side of the device, according to aspects of the present disclosure.
Figure 8B:
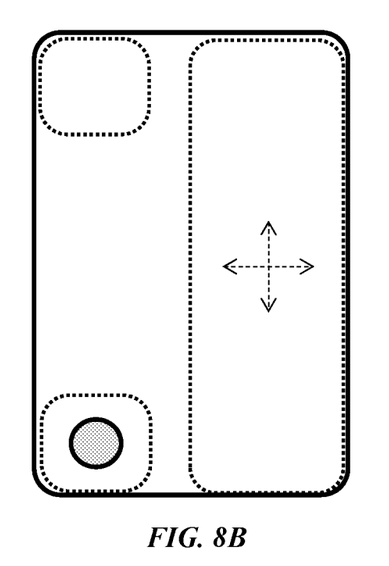
Figure 9A:
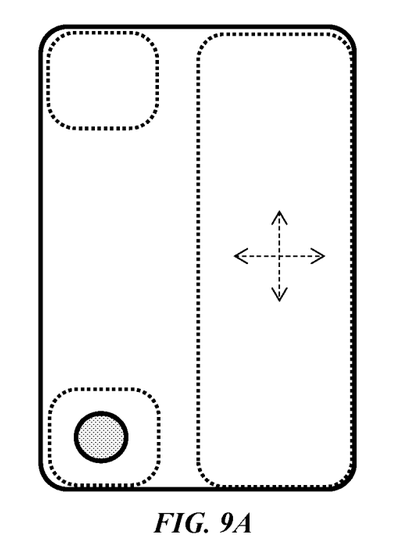
FIG. 9A-9B show another possible combined gesture on the back side of the device, according to aspects of the present disclosure.
Figure 9B:
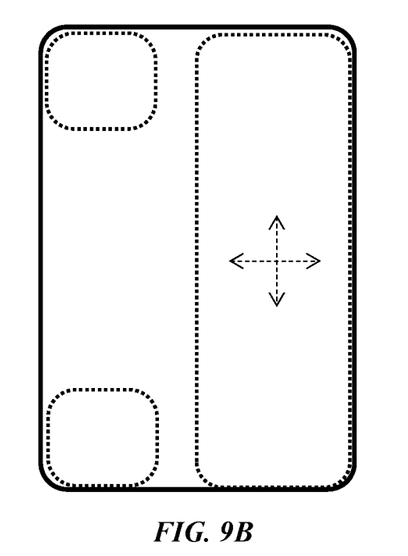

Combinations of force presses and force swipe gestures on the back side of the device may also be used to provide additional interaction possibilities. FIGS. 8A-8B and 9A-9B illustrate several such combined gestures. For example, in FIG. 8A, a force press on the upper left corner of the device may be combined with swiping on the right half to switch between multi-tasking applications. In FIG. 8B, for the same embodiment as FIG. 8A, a force press on the lower left corner of the device may be combined with swiping on the right half to translate content on the screen. In FIG. 9A, a force press on the left half of the device may be combined with swiping on the right half of the device to switch between multi-tasking applications. In FIG. 9B, for the same embodiment as FIG. 9A, swiping on the right half of the device without any force press on the left half of the device may tilt the content being viewed.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method for detecting back-side force in a mobile device, the method comprising:
    measuring, by a force sensor of the mobile device, force applied to a surface of the device, wherein the force sensor comprises a force sensing layer;
    detecting, by a touch sensor of the mobile device, one or more touch contacts, wherein the touch sensor comprises a touch sensing display layer adjacent to the force sensing layer;
    determining, by a processor circuit of the mobile device, whether the measured force correlates to at least one of the one or more touch contacts;
    in response to determining that the measured force correlates to the at least one of the one or more touch contacts, initiating, by the processor circuit, a front-side force specific action; and
    in response to determining that the measured force does not correlate to at least one of the one or more touch contacts, initiating, by the processor circuit, a back-side force specific action.

2. The method of claim 1, further comprising processing, with the processor circuit, the measurement of force to produce a map of applied force.

3. The method of claim 2, where the map of applied force is substantially linearly proportional to the actual applied force.

4. The method of claim 2, where the map of applied force is substantially linearly proportional to the actual applied force until a threshold level of force is reached, after which the map of applied force is non-linearly proportional with respect to the actual applied force.

5. The method of claim 2, further comprising generating, with the processor circuit, a map of a location in which the one or more touch contacts are detected by the touch sensor.

6. The method of claim 5, further comprising determining, with the processor circuit, centroids of the touch contacts and centroids of the applied force using a map of at least one of the location and intensity of touch contacts and a map of at least one of the location and intensity of applied force, to correlate the measured force to at least one of the one or more touch contacts.

7. The method of claim 1, where the back-side force specific actions are triggered by any of a number of force locations and/or force gestures on the back side of the device.

8. The method of claim 1, where the force sensor measures the force applied by sensing strain.

9. The method of claim 1, where the force sensor comprises a compressible force sensing layer; and
    the force sensor measures the applied force by sensing a variation in capacitance across the compressible force sensing layer.

10. The method of claim 1, where the touch sensor comprises a capacitive touch sensor, a touch screen, or a combination thereof.

11. A system for detecting back-side force in a mobile device, comprising:
    a force sensor comprising a force sensing layer, and configured to measure force applied to a surface of the device;
    a touch sensor comprising a touch sensing display layer adjacent to the force sensing layer, and configured to detect one or more touch contacts; and
    a processor circuit coupled to the force sensor and the touch sensor, and configured to execute instructions causing the processor to:
    determine whether the force measured by the force sensor correlates to at least one of the one or more touch contacts;
    in response to determining that the measured force correlates to the at least one of the one or more touch contacts, initiate a front-side force specific action; and
    in response to determining that the measured force does not correlate to at least one of the one or more touch contacts, initiate a back-side force specific action.

12. The system of claim 11, where the instructions further cause the processor circuit to process the measurement of force to produce a map of applied force.

13. The system of claim 12, where the map of applied force is substantially linearly proportional to the actual applied force.

14. The system of claim 12, where the map of applied force is substantially linearly proportional to the actual applied force until a threshold level of force is reached, after which the map of applied force is non-linearly proportional with respect to the actual applied force.

15. The system of claim 12, where the instructions further cause the processor circuit to generate a map of a location in which the one or more touch contacts are detected.

16. The system of claim 15, where the instructions further cause the processor circuit to determine centroids of the touch contacts and centroids of the applied force using a map of at least one of the location and intensity of touch contacts and a map of at least one of the location and intensity of applied force, to correlate the measured force to at least one of the one or more touch contacts.

17. The system of claim 11, where the back-side force specific actions are triggered by any of a number of force locations and/or force gestures on the back side of the device.

18. The system of claim 11, where the force sensor is configured to measure the force applied by sensing strain.

19. The system of claim 11, where:
   the force sensor comprises a compressible force sensing layer; and
   the force sensor is configured to measure the applied force by sensing a variation in capacitance across the compressible force sensing layer.

20. The system of claim 11, where the touch sensor comprises a capacitive touch sensor, a touch screen, or a combination thereof.

21. A mobile device comprising:
   the system of claim 11; and
   a touch screen comprising the touch sensor.

* * * * *